United States Patent
Vo et al.

(10) Patent No.: US 10,686,600 B1
(45) Date of Patent: Jun. 16, 2020

(54) ASYNCHRONOUS STEP-UP AUTHENTICATION FOR CLIENT APPLICATIONS

(71) Applicant: UIPCO, LLC, San Antonio, TX (US)

(72) Inventors: Hoang Trung Vo, Little Elm, TX (US); Hieu Nguyen, Southlake, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 126 days.

(21) Appl. No.: 15/796,042

(22) Filed: Oct. 27, 2017

(51) Int. Cl.
| | | |
|---|---|---|
| *H04L 29/06* | (2006.01) | |
| *H04L 9/32* | (2006.01) | |
| *G06F 21/33* | (2013.01) | |
| *H04W 12/08* | (2009.01) | |
| *H04W 12/06* | (2009.01) | |

(52) U.S. Cl.
CPC ............ *H04L 9/3213* (2013.01); *G06F 21/33* (2013.01); *H04L 63/0892* (2013.01); *H04W 12/06* (2013.01); *H04W 12/08* (2013.01)

(58) Field of Classification Search
CPC .... H04L 9/3213; H04L 63/0892; G06F 21/33
See application file for complete search history.

(56) References Cited

U.S. PATENT DOCUMENTS

| | | | | |
|---|---|---|---|---|
| 9,578,015 | B2* | 2/2017 | Xu | H04L 63/0815 |
| 10,250,594 | B2* | 4/2019 | Chathoth | H04L 63/0807 |
| 2016/0285871 | A1* | 9/2016 | Chathoth | H04L 63/0838 |
| 2016/0337346 | A1* | 11/2016 | Momchilov | G06F 21/34 |
| 2017/0063932 | A1* | 3/2017 | Hubbard | H04L 63/20 |
| 2018/0082284 | A1* | 3/2018 | Gomes | G06Q 20/36 |
| 2018/0176222 | A1* | 6/2018 | Bhaskar | H04L 63/061 |
| 2018/0211248 | A1* | 7/2018 | Sims | H04W 12/06 |
| 2018/0234411 | A1* | 8/2018 | Masiero | H04L 63/0853 |
| 2019/0034924 | A1* | 1/2019 | Prabhu | G06Q 20/3821 |

* cited by examiner

*Primary Examiner* — Mohammad A Siddiqi
(74) *Attorney, Agent, or Firm* — Perkins Coie LLP

(57) ABSTRACT

Embodiments described herein disclose methods and systems for authorizing transactions received from client applications. The transaction request can include a first access token. After validating the first access token, the system can determine whether additional authentication is needed to authorize the transaction. If additional authentication is needed, the system can determine the authentication requirements. Once the additional authentication is received and verified, the system can generate a second access token and authorize the transaction by releasing the first access token.

14 Claims, 7 Drawing Sheets

ASYNCHRONOUS STEP-UP AUTHENTICATION FOR CLIENT APPLICATIONS

BACKGROUND

The Internet of Things ("IoT") has transformed the way people live and work. For example, people can turn on heaters and sprinklers remotely; check on pets while at work; and order items, transfer money, and make investments simply by making a request into an IoT device. These emergent technologies have altered the landscape for security because the application receiving the request often is not associated with the entity that approves the request. Moreover, many IoT devices allow for use by multiple users, creating additional security concerns.

Figure 1:
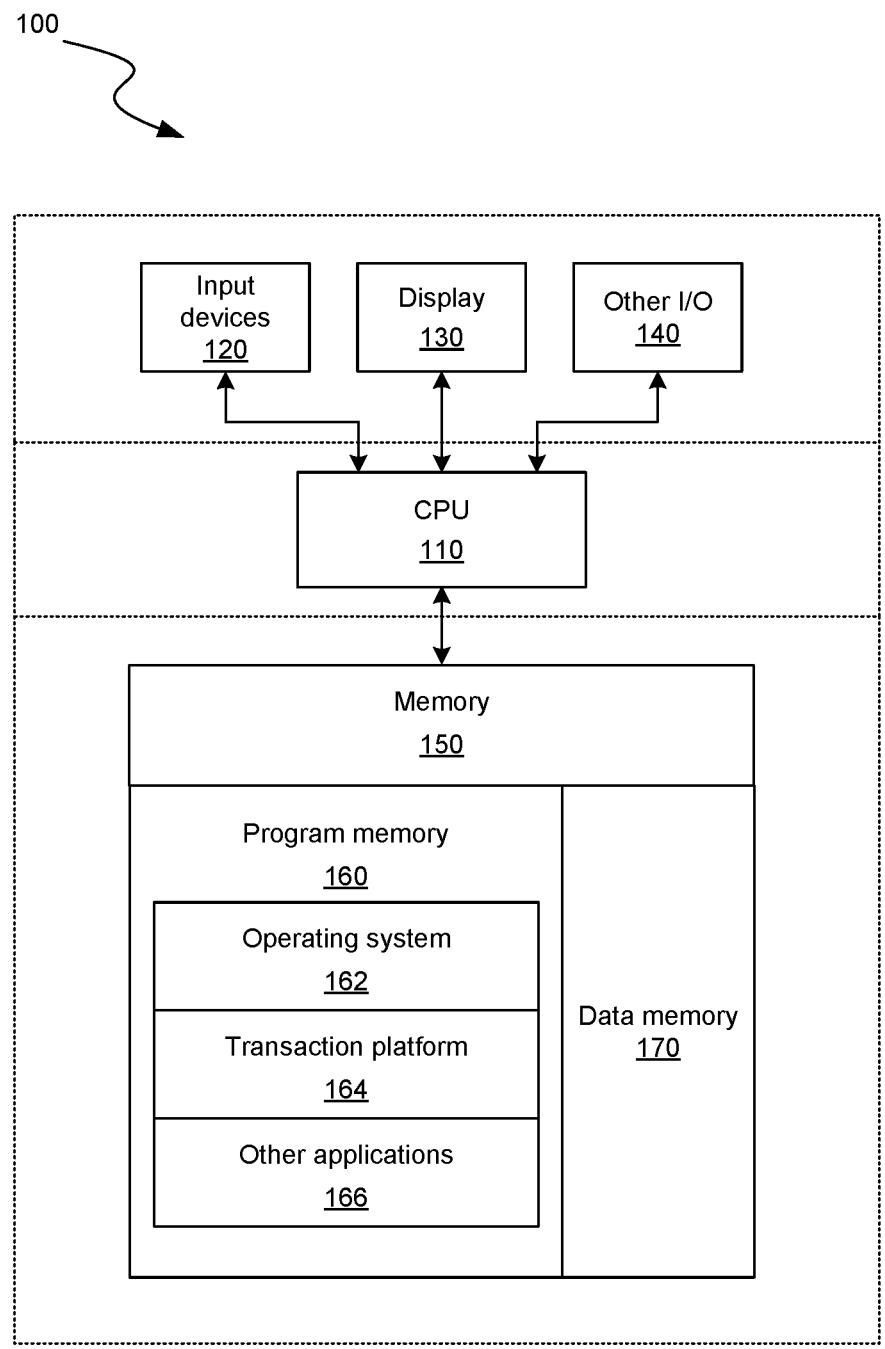
FIG. 1 is a block diagram illustrating an overview of devices on which some implementations can operate.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Embodiments for authenticating transactions received from third-party client applications are disclosed. For better user experiences and with the abundance of emergent Internet of Things ("IoT") devices, some client applications allow users to request transactions requiring authorization from an entity that is unrelated to the client device or client application making the request. Currently, the authorizing entity authorizes the transaction by trusting that proper authentication has been obtained by the client application.

For example, a social media application (e.g., Facebook) can allow a user to send money to a second user via the social media application. Before the funds are sent, an authorizing service associated with the authorizing entity (e.g., service associated with the bank holding the funds) has to authorize the funds transfer. When the social media application requests authorization for the transaction on behalf of the user, the social media application can send a first access token, code, or other identifier that is randomly generated. The first access token can be an identifier that maps to sensitive data through a tokenization system and only allows the accessing entity access to certain data. Currently, the authorizing service checks the first access token, and, if the token is valid (i.e., belongs to requesting user) authorizes the transaction. In some embodiments, prior to authorizing the transaction, mutual authentication is leveraged to validate that the client application is being sent from a trusted server.

However, in many situations, the current solution is adequate because it requires the authorizing service to assume that the person requesting the transaction is in fact the user. Such trust may not be warranted because the request may have been made from the user's account but not with the user's permission (e.g., the user leaves the user's social media application open on a public device and a third party fraudulently requests a transaction) or the request may have been made using a shared device but not with the user's permission (e.g., the user shares a device with his or her family such as a Google Home or Amazon Echo device and a child or visitor requests a transaction that is unauthorized by the user).

Another possible solution is to build out an authentication flow on the client side such that the user provides additional authentication via the client. This solution introduces numerous problems: (1) the user's credential is shared with the client application and/or client device making the solution less secure, (2) the user is required to remember another credential, (3) the client device or client application has to securely store the separate credential for that specific integration, and (4) a separate solution has to be created for each client's different IoT device or application. Thus, this solution causes a user experience limitation, security reduction, and application maintenance requirement that new applications would have to build and support.

Embodiments of the disclosed technology solves the problems described above by allowing authorizing services to leverage existing trusted authenticators that are familiar to the user and by decoupling the IoT device and integration application from the additional authentication process.

In some embodiments, a client application can send a request for authorization of a transaction requested by the user via the client application or client device. The request can be sent with a first access token. When the authentication service validates the first access token, the authentication service can determine whether step-up authentication is needed to authorize the transaction (e.g., if it is a high-risk transaction, if the user prefers a certain level of authentication). If step-up authentication is required, then the step-up authentication service determines what type of authentication is necessary (e.g., a code sent to the user's device that the user must text to the organization or enter into a website, a response to an email or push notification, a call to a certain number, logging into an account). The step-up authentication service can send the authentication request to the user, and verify the user's credentials when the response is received from the user. After verifying the user's credentials, the step-up authentication service can generate a second access token and release the second access token to the authentication service to authorize the transaction.

The second access token can be active for a predetermined timeframe (e.g., 5 minutes, 10 minutes, 24 hours)

whereas the first access token can be active for a longer period of time. The second access token can be considered a more sensitive token that is short-lived via any combination of time-expiry or number of uses. In some embodiments, the second access token can be used to authorize subsequent transactions if those transactions are requested prior to the expiration of the second access token.

The step-up authentication requested by or provided to the authorizing service can be requested via a different channel (e.g., text message, email message, push notification, phone call) than the authentication requested from or provided to the client application, providing additional security. In some embodiments, the authentication process of the disclosed technology is asynchronous in the sense that the entire step-up process is not completed serially and does not occur all on one channel. That is, the user can continue to perform normal application functions on the client application that are non-sensitive between the request for step-up and the actual verification of the step-up authentication (which can take place in whole or in part via a different application or different device).

This disclosure describes systems and processes designed to authorize transactions requested via a third-party application. Various embodiments provide the following technological improvements: (1) asynchronous execution of the step-up authentication process, (2) decoupled client-side authorized invocations with server-side authentications, (3) the ability to use existing authenticators without a requirement to invest in a client-side authentication experience, and (4) the ability to authorize a second high risk transaction without requiring additional user credentials by re-using an access token within a certain time period.

In the following description, for the purposes of explanation, numerous specific details (e.g., screen shots) are set forth in order to provide a thorough understanding of embodiments of the present technology. It will be apparent, however, that embodiments of the present technology may be practiced without some of these specific details Suitable System Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that send transaction requests and receive authentication requests. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 140 can also be coupled to the processor, such as a network card, video card, audio card, USB, FireWire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, transaction platform 164, and other application programs 166. Memory 150 can also include data memory 170 that can include authentication information, device preferences, authentication preferences, bank account information, investment information, pre-approvals, configuration data, settings, owner options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
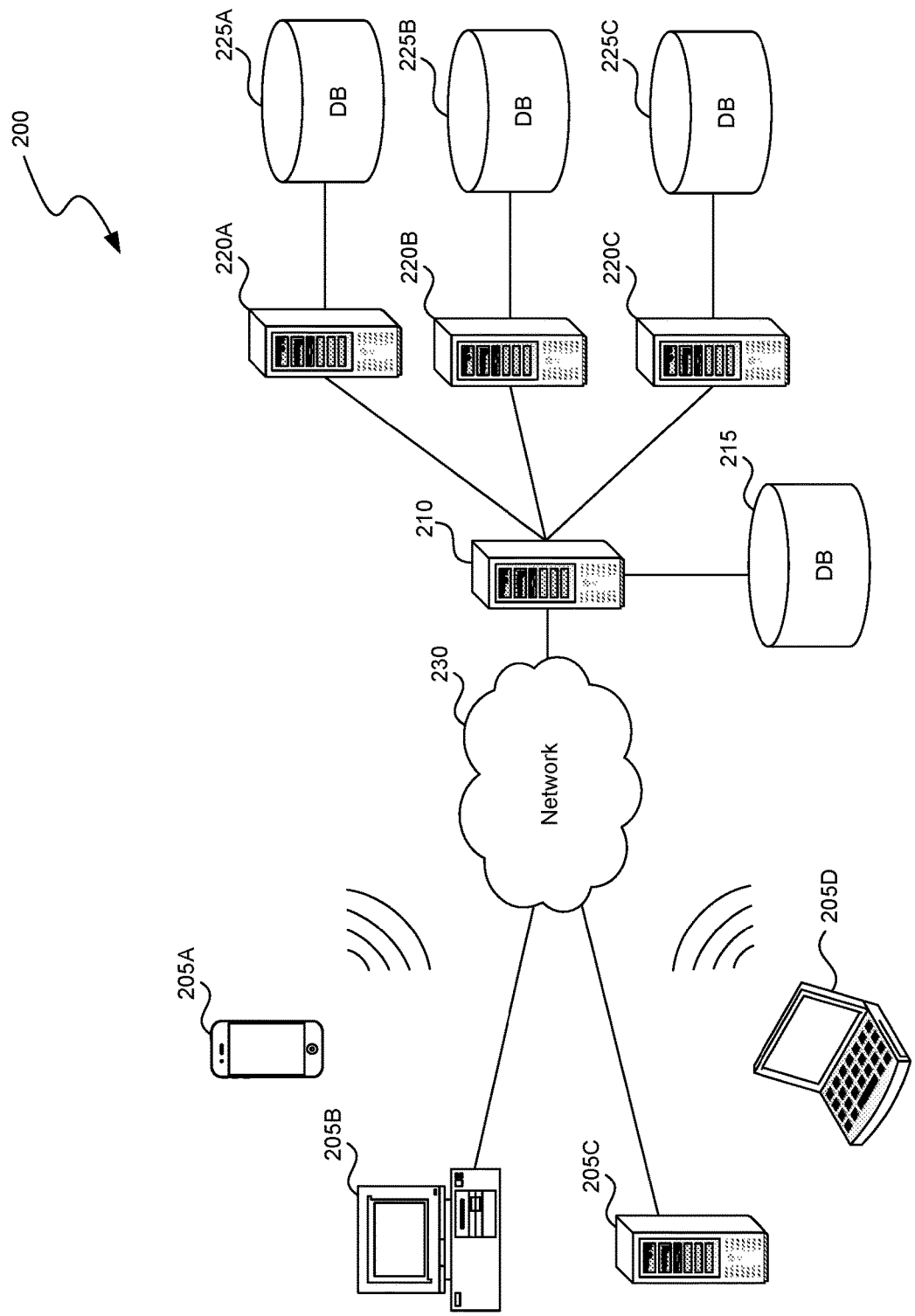
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device 210.

In some implementations, server computing device 210 can be an edge server that receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server computing device 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as access tokens, member or user profiles, transactions, authentication information, device preferences, authentication preferences, bank account information, investment information, and pre-approvals. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
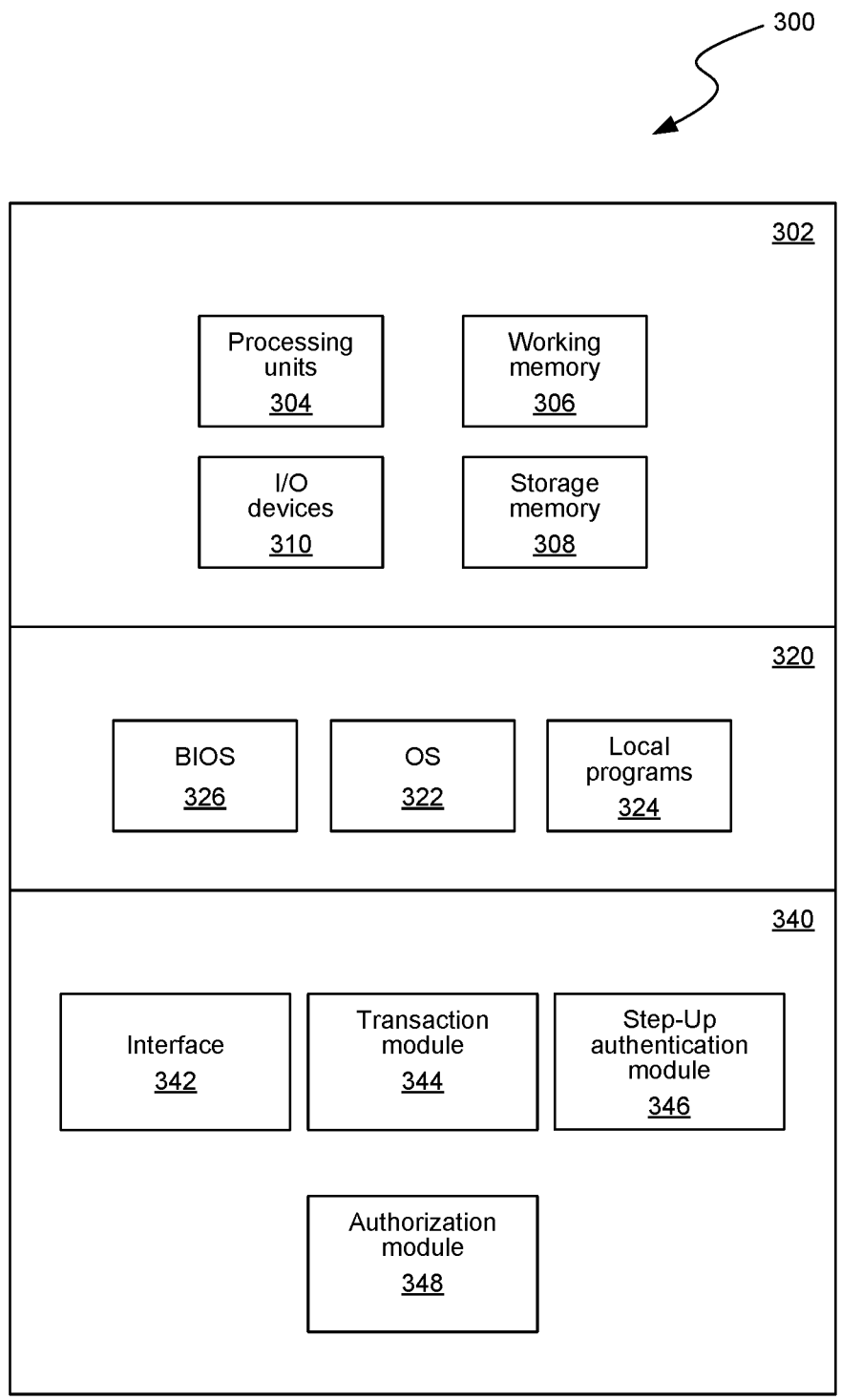
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware, including processing units 304 (e.g., CPUs, GPUs, APUs, etc.), working memory 306, storage memory 308, and input and output devices 310. Components 300 can be implemented in a client computing device such as client computing devices 205 or on a server computing device, such as server computing device 210 or 220.

General software 320 can include various applications, including an operating system 322, local programs 324, and a basic input output system (BIOS) 326. Specialized components 340 can be subcomponents of a general software application 320, such as local programs 324. Specialized components 340 can include transaction module 344, step-up authentication module 346, authorization module 348, and components that can be used for transferring data and controlling the specialized components, such as interface 342. In some implementations, components 300 can be in a computing system that is distributed across multiple computing devices or can be an interface to a server-based application executing one or more of specialized components 340.

Transaction module 344 receives a request to authorize a transaction initiated by a user via a client application. The request can include a first access token and the transaction details (e.g., amount of funds, parties involved, timeframe, account numbers). The first access token can be a code or other identifier of the user sent from the client application allowing the client application to access the user's data. The first access token can be temporary in its existence but typically stays active until the user changes a password or stops using the client application. Transaction module 344 can validate the first access token via the standard Oauth2.0 spec (https://tools.ietf.org/html/rfc6749#page-48).

Transaction module 344 can review the request and determine whether step-up authentication is required. Step-up authentication can be required based on, for example, enterprise rules, government regulations, or user preferences. For example, a transaction may be considered high risk (and therefore requiring step-up authentication) if the transaction value is over a certain threshold amount of money, if the user has been a victim of identity theft in the past, if the user's behavior is out of the ordinary, and/or if the receiving entity is suspicious. In some embodiments, step-up authentication can be used regardless of whether the transaction is high risk. For example, the user can have a preference for requiring step-up authentication for all of the user's transactions or the transaction module 344 can perform a random or periodic step-up authentication on a transaction. If transaction module 344 determines that step-up authentication is not required, transaction module 344 can send the first access token to authorization module 348 to be released. On the other hand, if transaction module 344 determines that step-up authentication is required, the transaction or transaction details are sent to step-up authentication module 348.

Step-up authentication module 346 receives the transaction details from transaction module 344 and determines the authentication requirements to authorize the transaction. For example, some transactions may require a certain type of authentication (e.g., biometric, knowledge-based, item-based) via a specific channel (e.g., via an application, text message, or web portal). In some embodiments, the channel and type of authentication required may be different from the channel and type of authentication required for the client application in an effort to increase security. For example, if the user authenticated to the client application using the user's device and a username/password, step-up authentication module may require the user to provide a voice sample of a code received by the device or by a second device associated with the user. In some embodiments, once the type and channel for authentication is known, step-up authentication module can notify the client application and/ or the user that additional authentication information is needed before the transaction will be authorized and that the user will be receiving a request via text, email, phone call, etc. If the client application is notified, then the client application can message the user via the client application regarding the additional authentication required.

Step-up authentication module 346 can send an authentication request to the user. Once a response is received and verified, the step-up authentication module 346 can generate a second access token for the transaction. The second access token can have an expiration (i.e., the second access token is not active after the expiration). The duration the second access token is active can be predetermined. In some embodiments, the second access token can be used to authorize a second transaction if the second transaction takes place during the predetermined time period. In such cases, a different second access token is generated and exchanged with the original second access token to process the transaction. In this way, if the user authorizes a transaction that requires step-up authentication and shortly thereafter authorizes another transaction that requires step-up authentication, the user will be asked only once to provide additional authentication. In some embodiments, the second request is received from the same client application but with a different form factor. For example, if the application is Facebook, the first request could come from Facebook Mobile whereas the second request could come from Facebook Messenger. Step-up authentication module 346 can release (i.e., passing) the second access token to authorization module 348.

Authorization module 348 receives the first access token from transaction module 344 after the first access token has been validated. If step-up authentication is required for the transaction, then authorization module 348 holds the transaction until the second access token is received from step-up authentication module 346. When the second access token is received, authorization module 348 releases the first access token, which provides the authorization to proceed with the transaction. In some embodiments, releasing the first access token allows authorization module 348 to use the second access token that is generated from step-up authentication module 346 instead of the first access token. The first access token can be expired or deleted in favor of re-using the second access token.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
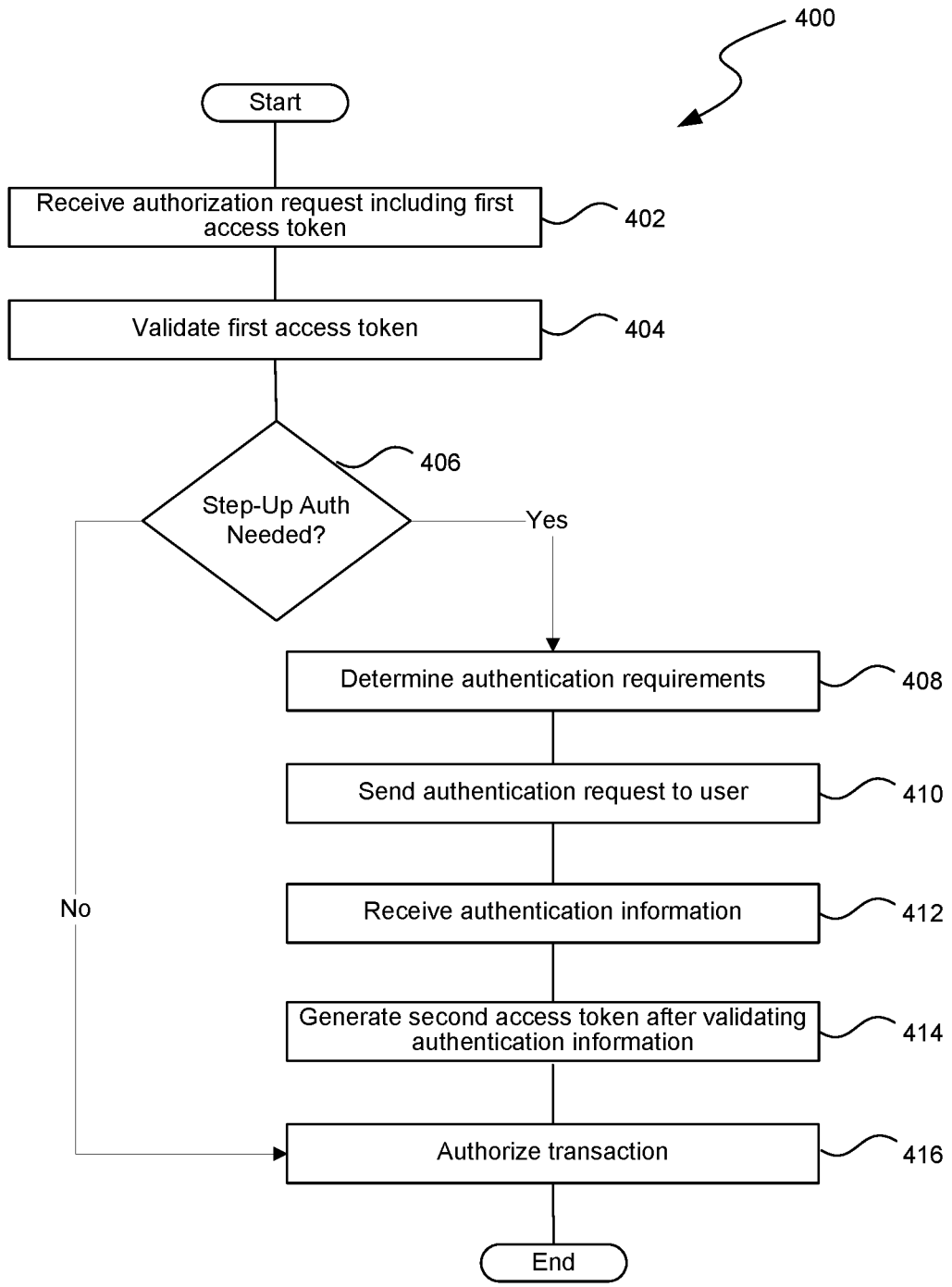
FIG. 4 is a flow diagram illustrating a process used in some implementations of authenticating a transaction using step-up authentication.

FIG. 4 is a flow diagram illustrating a set of operations 400 for authenticating a transaction using step-up authentication. In some embodiments, in this and other flow diagrams of operations, fewer than all of the operations in the set of operations are performed, whereas, in other embodiments, additional operations are performed. Moreover, in some embodiments, the operations may be performed in different orders or in parallel. The operations can be performed by components illustrated in FIGS. 1-3.

Receiving operation 402 receives an authorization request from a client application. The request can include transaction details such as parties involved, accounts, amount of funds, and a first access token. Validating operation 404 validates the first access token using the Oauth2.0 spec (e.g., https://tools.ietf.org/html/rfc6749#page-48). To validate the first access token, the system can check whether the first access token is active, whether the first access token has permission to "scope" required by the API, and whether the token belongs to the user. Decision block 406 determines whether step-up authentication is required for the transaction. Step-up authentication may be required if the transaction is high risk, if the user has a preference for step-up authentication, if the user is in a different country, or other reasons. In some embodiments, the transaction risk can be scored and compared to a threshold. If the score is higher than the threshold, step-up authentication is used.

If step-up authentication is not required, decision block 406 branches to authorizing operation 416, where the transaction is authorized. To authorize the transaction the first access token is released and the transaction is completed. A notification can be sent to the client application or directly to the user that the transaction has been authorized and/or completed.

If step-up authentication is required, decision block 406 branches to determining operation 408 where the system determines the authentication requirements for the transaction. The system can determine how or what channel should be used to contact the user (e.g., web portal, text message, push notification) and the authentication type and information needed (e.g., biometrics, username/password, device fingerprint). The type and method of authentication can be determined by user preferences, risk of transaction, information stored in the user profile, or past interactions with the user. In some embodiments, determining operation 408 chooses the authentication requirements depending on the client application and how the user is authenticated on the client application and determines an authentication plan that is different from the authentication provided to the client application (e.g., if the user authenticates to the client application using a username/password and device combination, then the user may be required to authenticate using a second device and a biometric combination).

Sending operation 410 sends the authentication request to the user via the channel determined by determining operation 408. Receiving operation 412 receives the authentication information. In some embodiments, the system monitors a queue holding the request until the user responds. Generating operation 414 generates a second access token after validating the authentication information. Validating the authentication information may be done by comparing stored credentials in a user profile with information returned by the user. The second access token can be a token with a predetermined active time. In some embodiments, the second access token can be re-used within the predetermined active time. Once the second access token is generated and released, the system authorizes the transaction in authorizing operation 416.

Figure 5:
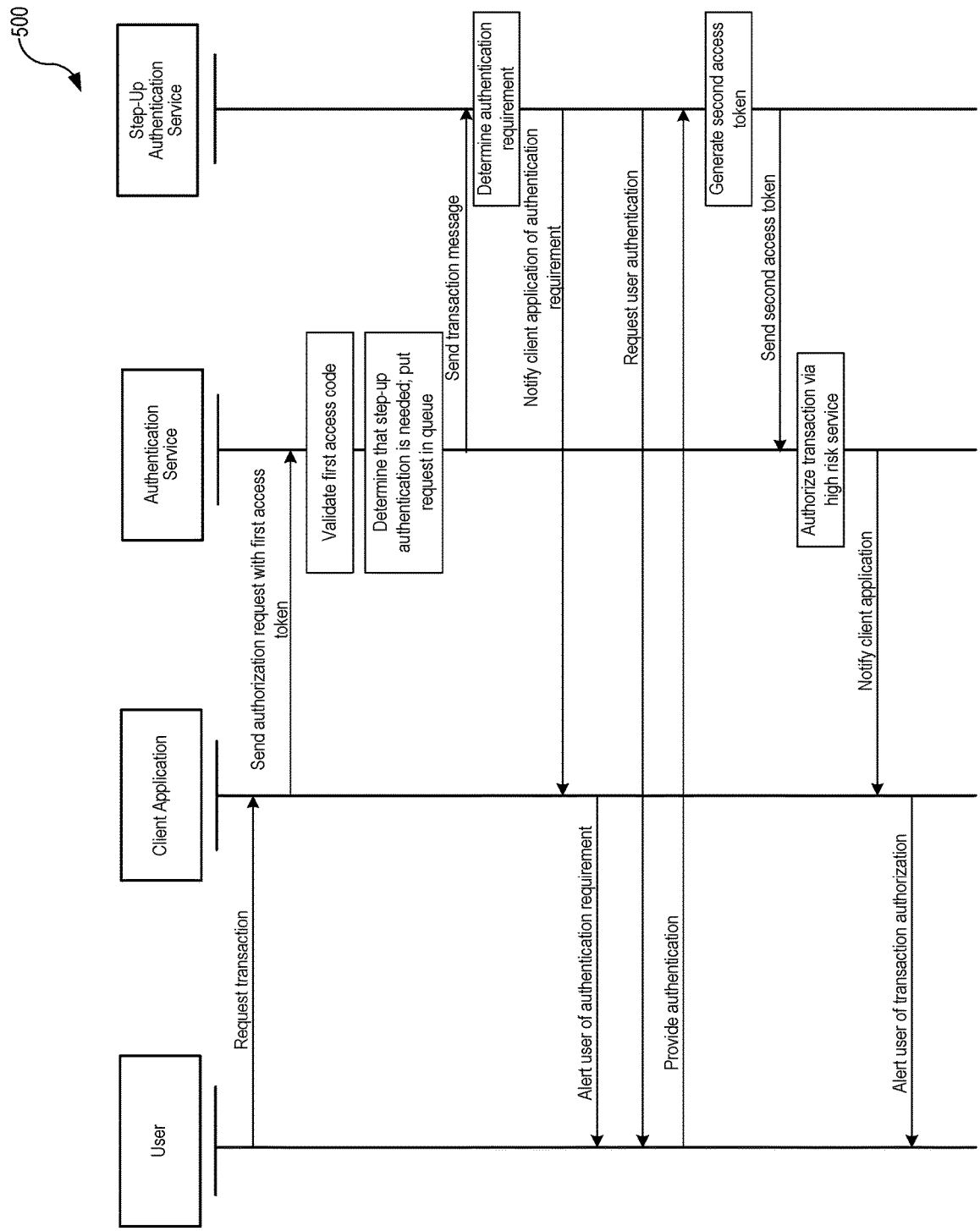
FIG. 5 is a sequence diagram illustrating a process used in some implementations of authenticating a transaction using step-up authentication.

FIG. 5 is a sequence diagram illustrating an example of a sequence that can be used in some embodiments of the disclosed technology. The user can request a transaction via a client application. The client application can send an authorization request with a first access token to an authentication service. The authentication service can validate the first access token and determine whether step-up authentication is needed. A transaction message including the transaction details can be sent to the step-up authentication service and put into a queue. The step-up authentication service can determine additional authentication requirements for the transaction. The step-up authentication service can notify the client application of the additional authentication requirement, and the client application can alert the user of the authentication requirement. The step-up authentication service can request the authentication from the user and the user can provide the authentication. Once the user's credentials have been verified, the step-up authentication service can generate a second access token and release the second access token to the authentication service to signal that the step-up authentication is completed. The authentication service can authorize the transaction using an API such as a high-risk service API. The client application can be notified, that in turn can notify the user that the transaction has been authorized. In some embodiments, the authentication service sends a notification to the user that the transaction has been authorized.

Figure 6:
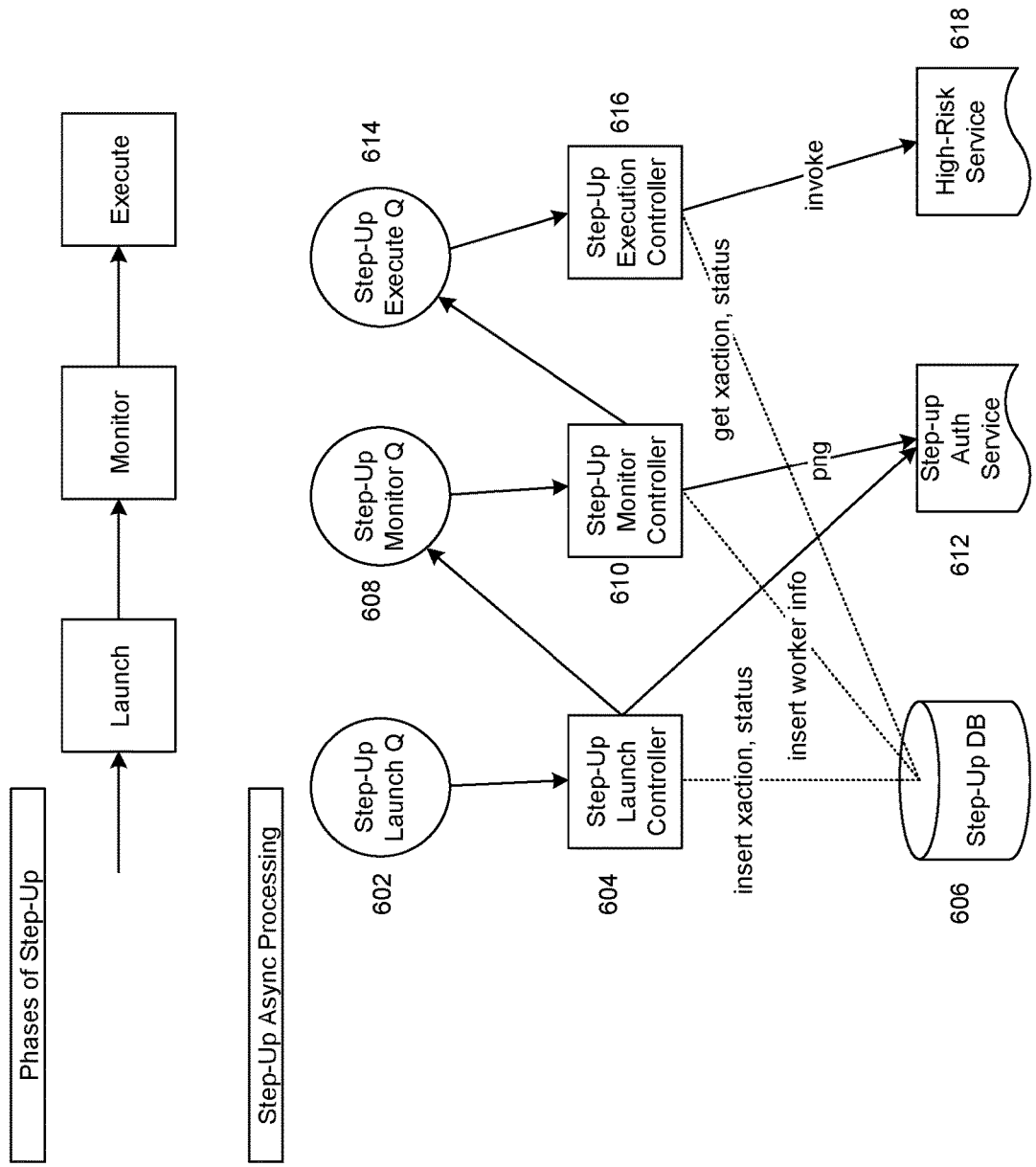
FIG. 6 is a diagram illustrating a process used in some implementations of authenticating a transaction using step-up authentication.

FIG. 6 is a diagram illustrating a process that can be used in some embodiments of the disclosed technology. From a high level perspective, when a request for a transaction triggers the process (e.g., due to a high-risk transaction), the system goes into launch mode. After the process is launched, the system goes into monitoring mode where the system waits for an indication that the additional authentication was received and verified. After receiving the indication that the additional authentication step was successful, the system moves to an execution mode where the transaction is authorized.

In the first mode, the launch mode, when the transaction request has been identified as requiring step-up authentication, the system writes the request to a message, puts the message in a queue (element 602) and sends the message to a step-up launch controller (element 604). This controller analyzes the request to determine the identity of the user, the status of the request, etc., and can use a step-up database (element 606).

The step-up launch controller (element 604) can call the step-up authentication service (element 612) to send the authentication request to the user. The step-up launch controller (element 604) can also kick off the second mode, which is the monitoring mode by writing a message to the step-up monitor queue (element 608). The message notifies the step-up monitor controller (element 610) to monitor for a response from the user.

Once the user has responded to the request and the response has been verified, the step-up monitor controller (element 610) launches the third phase and puts the message into the step-up execution queue (element 614). The step-up execution controller (element 616) receives a status of the request from the step-up database (element 606) and invokes the high risk service (element 618) to authorize the transaction.

Figure 7:
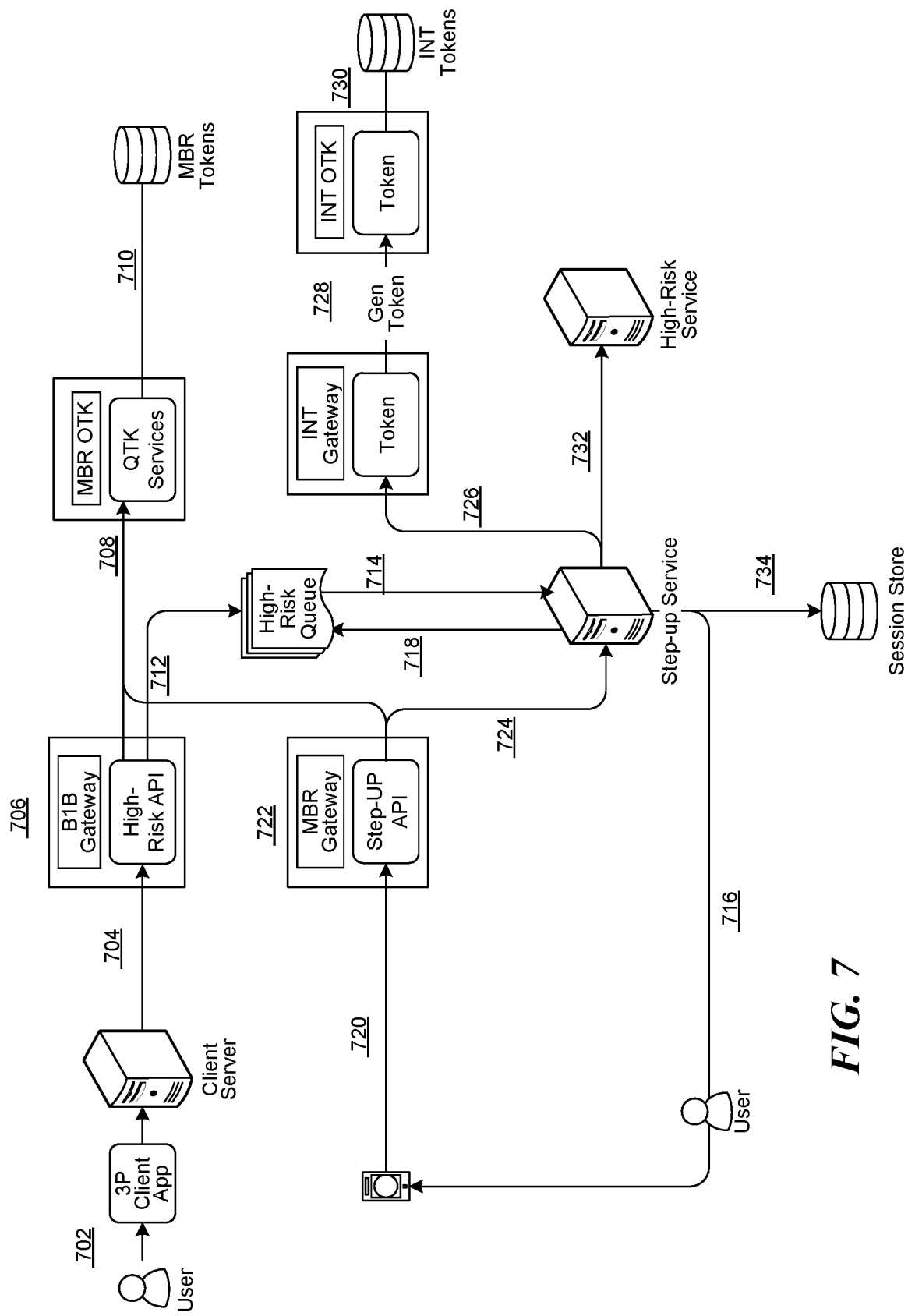
FIG. 7 is a diagram illustrating a process used in some implementations of authenticating a transaction using step-up authentication.

FIG. 7 is a diagram illustrating a process of using step-up authentication to authorize transactions. The user requests a transaction using a third-party application (702), and the client server sends the request with the first access token (704). The request and the first access token is received by a server associated with the entity via the gateway and assessed by a high risk API to determine whether the request requires step up authentication (706). Regardless of whether the request requires step-up authentication, the first access token is validated (708, 710). If step-up authentication is required, the first access token is not released until the second access token has been validated.

If the request requires step-up authentication, the step-up authentication service is launched and the request is put into a high risk queue (712). Once the request is put into the queue, the step-up authentication service is notified (714) and the step-up authentication is requested from the user via, for example, a push notification, a text message, or a phone call (716). The step-up system monitors for a response (718). The request can be stored and retrieved from a database (734). When the user sends a response, the system receives the response (720) and determines whether authorization should be granted (722). Assuming authorization is granted, the step-up API sends a message to the step-up service (724). In the embodiment illustrated in FIG. 7, the step-up service sends a message to the INT Gateway (726) where a second access token is generated (728) and stored in a database (730). The INT Gateway can isolate the service invocation gateway calls from client applications (such as those coming from MBR gateway), and calls between backend systems in FIG. 3 specialized components 340). Once the first access token and the second access token are validated and released, the high-risk service proceeds with completing the transaction (732).

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A computerized method of authorizing a transaction comprising:
   receiving, from a client application, a request to authorize a transaction requested by a user of the client application,
      wherein the request includes a first access token;
   validating, by an authentication service, the first access token;
   determining, by the authentication service, whether step-up authentication is required to authorize the transaction;
   when the step-up authentication is required:
      determining, by a step-up authentication service, authentication requirements to authorize the transaction;
      sending an authentication request to the user;
      receiving, from the user, a response to the authentication request;
      in response to verifying credentials in the response to the authentication request, generating, by the step-up authentication service, a second access token, wherein the second access token is active for a predefined timeframe;
      in response to receiving the second access token, authorizing, by the authentication service, the transaction by releasing the first second access token,
   receiving a second request to authorize a second transaction requested by the user; and
   authorizing the transaction using the second access token when the second transaction is requested within the predefined timeframe,
      wherein a third access token is generated and exchanged with the second access token.

2. The computerized method of claim 1, wherein the client application is a first channel, wherein the authentication request is sent to the user via a second channel that is different from the first channel.

3. The computerized method of claim 2, wherein the second channel is one of: a text message, an email message, or a push notification.

4. The computerized method of claim 1, wherein the second request is received from a different form of the client application.

5. The computerized method of claim 1, wherein the first access token is active for longer than the predefined timeframe.

6. The computerized method of claim 1, wherein the step-up authentication is required based on at least one of: an amount of funds involved with the transaction, an identity of the user, an identity of the client application, or a device used to request the transaction.

7. A non-transitory computer-readable storage medium containing a set of instructions that, when executed by one or more processors, cause a machine to:
   receive, from a client application, a request to authorize a transaction requested by a user of the client application, wherein the request includes a first access token;
   validate, by an authentication service, the first access token;
   determine, by the authentication service, whether step-up authentication is required to authorize the transaction;
   when the step-up authentication is required:
      determine, by a step-up authentication service, authentication requirements to authorize the transaction;
      send an authentication request to the user;
      receive, from the user, a response to the authentication request;
      in response to verifying credentials in the response to the authentication request, generate, by the step-up authentication service, a second access token, wherein the second access token is active for a predefined timeframe;
      in response to receiving the second access token, authorize, by the authentication service, the transaction by releasing the second access token;
   receive a second request to authorize a second transaction requested by the user; and
   authorize the transaction using the second access token when the second transaction is requested within the predefined timeframe,
      wherein a third access token is generated and exchanged with the second access token.

8. The non-transitory computer-readable storage medium of claim 7, wherein the client application is a first channel, wherein the authentication request is sent to the user via a second channel that is different from the first channel.

9. The non-transitory computer-readable storage medium of claim 8, wherein the second channel is one of: a text message, an email message, or a push notification.

10. The non-transitory computer-readable storage medium of claim 7, wherein the second request is received from a second client application that is different from the client application.

11. The non-transitory computer-readable storage medium of claim 7, wherein the first access token is active for longer than the predefined timeframe.

12. The non-transitory computer-readable storage medium of claim 7, wherein step-up authentication is required based on at least one of: an amount of funds involved with the transaction, an identity of the user, an identity of the client application, or a device used to request the transaction.

13. An authentication platform, comprising:
one or more processors; and
a computer readable storage medium having instructions stored thereon, which when executed by the one or more processors cause the authentication platform to:
receive, from a client application, a request to authorize a transaction requested by a user of the client application, wherein the request includes a first access token;
validate, by an authentication service, the first access token;
determine, by the authentication service, whether step-up authentication is required to authorize the transaction;
when the step-up authentication is required:
determine, by a step-up authentication service, authentication requirements to authorize the transaction;
send an authentication request to the user;
receive, from the user, a response to the authentication request;
in response to verifying credentials in the response to the authentication request, generate, by the step-up authentication service, a second access token, wherein the second access token is active for a predefined timeframe; and
in response to receiving the second access token, authorize, by the authentication service, the transaction by releasing the second access token;
receive a second request to authorize a second transaction requested by the user; and
authorize the transaction using the second access token when the second transaction is requested within the predefined timeframe,
wherein a third access token is generated and exchanged with the second access token.

14. The authentication platform of claim 13, wherein the client application is a first channel, wherein the authentication request is sent to the user via one of: a text message, an email message, or a push notification.

* * * * *